(12) United States Patent
Nakagaito et al.

(10) Patent No.: US 10,167,530 B2
(45) Date of Patent: Jan. 1, 2019

(54) METHOD OF MANUFACTURING HOT PRESS FORMED PART, AND HOT PRESS FORMED PART

(71) Applicant: JFE STEEL CORPORATION, Tokyo (JP)

(72) Inventors: Tatsuya Nakagaito, Tokyo (JP); Yuichi Tokita, Tokyo (JP); Toru Minote, Tokyo (JP); Yoshikiyo Tamai, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 454 days.

(21) Appl. No.: 14/914,392

(22) PCT Filed: Jul. 16, 2014

(86) PCT No.: PCT/JP2014/069498
§ 371 (c)(1),
(2) Date: Feb. 25, 2016

(87) PCT Pub. No.: WO2015/029653
PCT Pub. Date: Mar. 5, 2015

(65) Prior Publication Data
US 2016/0208355 A1    Jul. 21, 2016

(30) Foreign Application Priority Data

Aug. 29, 2013   (JP) ................................ 2013-177596

(51) Int. Cl.
*C21D 9/00* (2006.01)
*C21D 1/18* (2006.01)
(Continued)

(52) U.S. Cl.
CPC .......... *C21D 9/0068* (2013.01); *B32B 15/013* (2013.01); *C21D 1/18* (2013.01);
(Continued)

(58) Field of Classification Search
CPC .......... C21D 9/0068; C21D 1/18; C21D 1/60; C21D 6/002; C21D 6/005; C21D 6/008;
(Continued)

(56) References Cited

U.S. PATENT DOCUMENTS 7,842,142 B1* 11/2010 Kusumi ................. C21D 1/673
148/531
9,040,166 B2* 5/2015 Nakamaru ............ B32B 15/013
428/632

(Continued)

FOREIGN PATENT DOCUMENTS

EP    2684985    1/2014
GB    1490535    11/1977
(Continued)

OTHER PUBLICATIONS

International Search Report for International Application No. PCT/JP2014/069498 dated Oct. 14, 2014.

(Continued)

*Primary Examiner* — Cam N. Nguyen
(74) *Attorney, Agent, or Firm* — RatnerPrestia (57) ABSTRACT

A method of manufacturing a hot press formed part by hot pressing a coated steel sheet that is obtained by forming a Zn-based coating layer on a surface of a steel sheet includes: heating the coated steel sheet to a temperature range of 750° C. or more and 1000° C. or less; cooling a surface of the coated steel sheet; and hot press forming the coated steel sheet under a condition that a surface temperature of the coated steel sheet is 400° C. or less and an average temperature of the coated steel sheet is 500° C. or more or a temperature of a center position of the coated steel sheet in a thickness direction is 530° C. or more.

20 Claims, 6 Drawing Sheets

(51) Int. Cl.
*C21D 1/60* (2006.01)
*C21D 6/00* (2006.01)
*C21D 8/02* (2006.01)
*B32B 15/01* (2006.01)
*C22C 18/00* (2006.01)
*C22C 38/00* (2006.01)
*C22C 38/02* (2006.01)
*C22C 38/04* (2006.01)
*C22C 38/06* (2006.01)
*C22C 38/12* (2006.01)
*C22C 38/14* (2006.01)
*C22C 38/32* (2006.01)
*C22C 38/60* (2006.01)
*C23C 2/06* (2006.01)
*C23C 2/28* (2006.01)
*C23C 2/40* (2006.01)
*C21D 9/46* (2006.01)
*C21D 1/673* (2006.01)

(52) U.S. Cl.
CPC ............... *C21D 1/60* (2013.01); *C21D 6/002* (2013.01); *C21D 6/005* (2013.01); *C21D 6/008* (2013.01); *C21D 8/0205* (2013.01); *C21D 8/0221* (2013.01); *C22C 18/00* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/32* (2013.01); *C22C 38/60* (2013.01); *C23C 2/06* (2013.01); *C23C 2/28* (2013.01); *C23C 2/405* (2013.01); *C21D 1/673* (2013.01); *C21D 8/0226* (2013.01); *C21D 8/0236* (2013.01); *C21D 9/46* (2013.01)

(58) Field of Classification Search
CPC .. C21D 8/0205; C21D 8/0221; B32B 15/013; C21C 18/00; C21C 38/00; C21C 38/001; C21C 38/002; C21C 38/02; C21C 38/04; C21C 38/06; C21C 38/12; C21C 38/14; C21C 38/32; C21C 38/60; C23C 2/06; C23C 2/28; C23C 2/405; C22C 18/00; C22C 38/00; C22C 38/001; C22C 38/002; C22C 38/02; C22C 38/04; C22C 38/06; C22C 38/12; C22C 38/14; C22C 38/32; C22C 38/60
See application file for complete search history.

(56) References Cited

U.S. PATENT DOCUMENTS

| | | | |
|---|---|---|---|
| 9,598,744 B2 * | 3/2017 | Nakamaru | B32B 15/013 |
| 2001/0042393 A1 | 11/2001 | Kefferstein | |
| 2013/0252017 A1 * | 9/2013 | Nakajima | B32B 15/013 428/621 |
| 2014/0027026 A1 | 1/2014 | Schwinghammer | |
| 2014/0186655 A1 | 7/2014 | Okita | |
| 2014/0216611 A1 * | 8/2014 | Nakamaru | B32B 15/013 148/530 |

FOREIGN PATENT DOCUMENTS

| | | |
|---|---|---|
| JP | 3663145 | 6/2005 |
| JP | 200637141 | 2/2006 |
| JP | 2007182608 | 7/2007 |
| JP | 2012197505 | 10/2012 |
| JP | 2013091099 | 5/2013 |
| WO | 2012085247 | 6/2012 |

OTHER PUBLICATIONS

Japanese Office action dated Mar. 9, 2015 in Japanese Application No. 2014-556297, with English language translation.
Written Opinion of the International Search Authority for International Application No. PCT/JP2014/069498 dated Oct. 14, 2014.

* cited by examiner

SAMPLE COLLECTION POSITION

METHOD OF MANUFACTURING HOT PRESS FORMED PART, AND HOT PRESS FORMED PART

CROSS REFERENCE TO RELATED APPLICATIONS

This is the U.S. National Phase application of PCT/JP2014/069498, filed Jul. 16, 2014, which claims priority to Japanese Patent Application No. 2013-177596, filed Aug. 29, 2013, the disclosures of each of these applications being incorporated herein by reference in their entireties for all purposes.

TECHNICAL FIELD

The disclosure relates to a hot press formed part used in a structural part of automotive parts or the like and required to have strength and corrosion resistance, and a method of manufacturing the same. The disclosure particularly relates to a hot press formed part manufactured using, as a raw material, a coated steel sheet obtained by forming a coating layer on the surface of a steel sheet wherein, while hot press forming the coated steel sheet heated beforehand into a predetermined shape, the steel sheet is simultaneously quenched to attain predetermined strength, and a method of manufacturing the same.

BACKGROUND

In recent years, automotive emission control has been tightened for global environment protection. Under such circumstances, improving the fuel efficiency of vehicles has been an important issue, and strengthening and sheet metal thinning of automotive parts have been required. A highly effective way of obtaining a higher-strength and thinner-sheet-metal automotive part is to press form a steel sheet having predetermined strength as a raw material of the automotive part into a part of a predetermined shape. However, when the steel sheet has higher strength, its press formability is deteriorated, and forming the steel sheet into the desired part shape is more difficult.

The following technique is known to solve the above-mentioned problem: while hot press forming a raw material steel sheet heated to high temperature into a desired shape using a press mold, the steel sheet is quenched in the press mold by releasing heat, thus enhancing the strength of the hot press formed part. For example, Patent Literature (PTL) 1 proposes a technique in which, when manufacturing a part of a predetermined shape by hot pressing a blank sheet (steel sheet) heated to an austenite single phase region of about 900° C., the blank sheet is quenched in a press mold simultaneously with the hot press forming, thus enhancing the strength of the part.

However, the technique proposed in PTL 1 has a problem in that, when heating the steel sheet to high temperature of about 900° C. before the pressing, oxide scale (iron oxide) forms on the surface of the steel sheet, and the oxide scale peels during the hot press forming and damages the press mold or the surface of the hot press formed part. Besides, the oxide scale remaining on the surface of the part causes poor appearance and lower paint adhesion. Accordingly, the oxide scale on the surface of the part is typically removed by a process such as pickling or shot blasting. Such a process, however, causes lower productivity. Furthermore, while suspension parts of vehicles, automotive body structural parts, and the like are also required to have excellent corrosion resistance, the corrosion resistance of the hot press formed part by the technique proposed in PTL 1 is insufficient because a rust preventive film such as a coating layer is not provided on the raw material steel sheet.

For these reasons, there is demand for hot press forming techniques that can suppress the generation of oxide scale during heating before hot press forming and also improve the corrosion resistance of the hot press formed part. To meet this demand, coated steel sheets having films such as coating layers on their surfaces, hot press forming methods using coated steel sheets, etc. are proposed.

For example, PTL 2 proposes a technique in which a steel sheet coated with Zn (zinc) or a zinc-based alloy is heated to 700° C. to 1200° C. and then hot press formed to obtain a hot press formed part having a Zn—Fe-based compound or a Zn—Fe—Al-based compound on its surface. PTL 2 describes that the use of the steel sheet coated with Zn or a Zn-based alloy suppresses the oxidation of the surface of the steel sheet during heating before hot press forming, and also enables a hot press formed part having excellent corrosion resistance to be obtained.

With the technique proposed in PTL 2, the generation of oxide scale on the surface of the hot press formed part is suppressed to some extent. However, Zn in the coating layer may cause liquid metal embrittlement cracking, resulting in cracks of about 100 µm in depth in the surface layer part of the hot press formed part. Such cracks pose various problems such as a decrease in fatigue resistance of the hot press formed part.

In view of this problem, PTL 3 proposes a method in which, in the case of manufacturing a hot press formed article by hot press forming a coated steel sheet obtained by providing a Zn—Fe-based coating layer on the surface of a steel sheet, the coated steel sheet is heated to a temperature not less than the $Ac_1$ transformation temperature of the steel sheet and not more than 950° C. and then cooled to a temperature not more than the congealing point of the coating layer, before starting the forming. PTL 3 describes that liquid metal embrittlement can be suppressed by starting the forming after the coated steel sheet is cooled to the temperature not more than the congealing point of the coating layer.

CITATION LIST

Patent Literatures

PTL 1: GB 1490535 A
PTL 2: JP 3663145 A
PTL 3: JP 2013-91099 A

SUMMARY

Technical Problem

The technique proposed in PTL 3 can suppress liquid metal embrittlement cracking, that is, cracks of about 100 µm in depth in the surface of the hot press formed part. With the technique proposed in PTL 3, however, since the coated steel sheet is press formed in the state where the entire coated steel sheet has been cooled to the temperature not more than the congealing point of the coating layer, lower forming temperature causes an increase in strength and a decrease in ductility of the steel sheet during press forming, as a result of which new problems such as an increased press forming load and greater susceptibility of the steel sheet to fracture during forming arise.

The technique proposed in PTL 3 can suppress liquid metal embrittlement cracking (cracks in the surface of the hot press formed part, which are about 100 μm in depth from the interface between the coating layer and the steel substrate toward the inside of the steel substrate and in which Zn is detected from its interface). However, minute cracking which is about 30 μm or less in depth from the interface between the coating layer and the steel substrate toward the inside of the steel substrate and in which Zn is not detected from its interface may also occur in the surface of the hot press formed part. Such minute cracking is called microcracks. Microcracks pass through the interface between the coating layer and the steel substrate and reach the inside of the steel substrate (steel sheet), and may adversely affect the characteristics (fatigue resistance, etc.) of the hot press formed part.

It could be helpful to provide a method of, when manufacturing a hot press formed part by hot pressing a Zn-based coated steel sheet, suppressing microcracks while preventing an excessive increase in press forming load or a fracture of the steel sheet during hot press forming. It could also be helpful to provide a hot press formed part without microcracks.

Note that microcracks are completely different in depth from conventionally known liquid metal cracking, and are also different in position and whether or not Zn exists in the crack interface from liquid metal cracking. The form and phenomenon of microcracks are thus clearly different from those of liquid metal cracking.

Solution to Problem

We first studied means for suppressing minute cracking (microcracks) caused when hot press forming a Zn-based coated steel sheet.

Although the microcrack occurrence mechanism is still unclear, forming the Zn-based coated steel sheet at high temperature may induce minute cracking in the surface of the coated steel sheet. The minute cracking has a depth of about 30 μm or less from the interface between the coating layer and the steel substrate (steel sheet), and passes through the interface between the coating layer and the steel substrate (steel sheet) and reaches the inside of the steel sheet. As a result of making various research on this problem, we discovered that microcracks are completely suppressed by setting the temperature of the coated steel sheet during hot press forming to about 400° C. or less. Further, the effect of significantly reducing the amount of coating attached to the press mold was obtained by setting the temperature of the coated steel sheet during hot press forming to about 400° C. or less as mentioned above.

However, when the temperature of the steel sheet during press forming is lower, the strength of the steel sheet is higher, and so the press forming load increases. Besides, when the temperature of the steel sheet during press forming is lower, the ductility of the steel sheet is lower, and so the steel sheet is more susceptible to fracture during forming. Thus, the advantages of the hot press forming cannot be exploited if the temperature of the steel sheet during the press forming is lower. These problems are noticeable especially when the temperature of the coated steel sheet throughout the sheet thickness is about 400° C. or less during the press forming, leading to new problems such as lower quality or lower productivity or yield rate of the press formed part.

We then conceived hot press forming in the state where only the surface layer part of the coated steel sheet is cooled.

As mentioned earlier, microcracks tend to occur in the area near the surface of the coated steel sheet. We accordingly assumed that microcracks can be suppressed even by hot press forming the coated steel sheet in the state where the center position of the coated steel sheet in the thickness direction is kept at high temperature and only the surface layer part of the coated steel sheet is cooled to about 400° C. or less.

We made further research based on this assumption, and discovered that microcracks can be suppressed if the coated steel sheet is hot press formed in the state where the coated steel sheet is locally cooled only in the vicinity of the surface layer with the surface temperature of the coated steel sheet being 400° C. or less, even though the average temperature of the coated steel sheet is 500° C. or more or the temperature of the center position of the coated steel sheet in the thickness direction is 530° C. or more. We also discovered that an increase in press forming load or a fracture of the steel sheet during forming can be prevented if the average temperature of the coated steel sheet is 500° C. or more or the temperature of the center position of the coated steel sheet in the thickness direction is 530° C. or more, even though the surface temperature of the coated steel sheet during hot press forming is 400° C. or less.

Experiments leading to these discoveries are described below. Note that "%" indicating the content of the chemical composition in the following description is "% by mass".

First, using a cold rolled steel sheet (chemical composition: Fe-0.23% C-0.25% Si-1.40% Mn-0.01% P-0.005% S-0.0020% B-0.03% Al-0.005% N, $Ac_3$ transformation temperature: 801° C.) with a thickness of 1.6 mm as a steel sheet, a coated steel sheet was prepared by forming a Zn-based coating layer (Zn-12% by mass Ni coating, coating weight per side: 65 g/m$^2$) on the surface of the steel sheet. A blank sheet of 200 mm×400 mm was then punched from the coated steel sheet.

Figure 1:
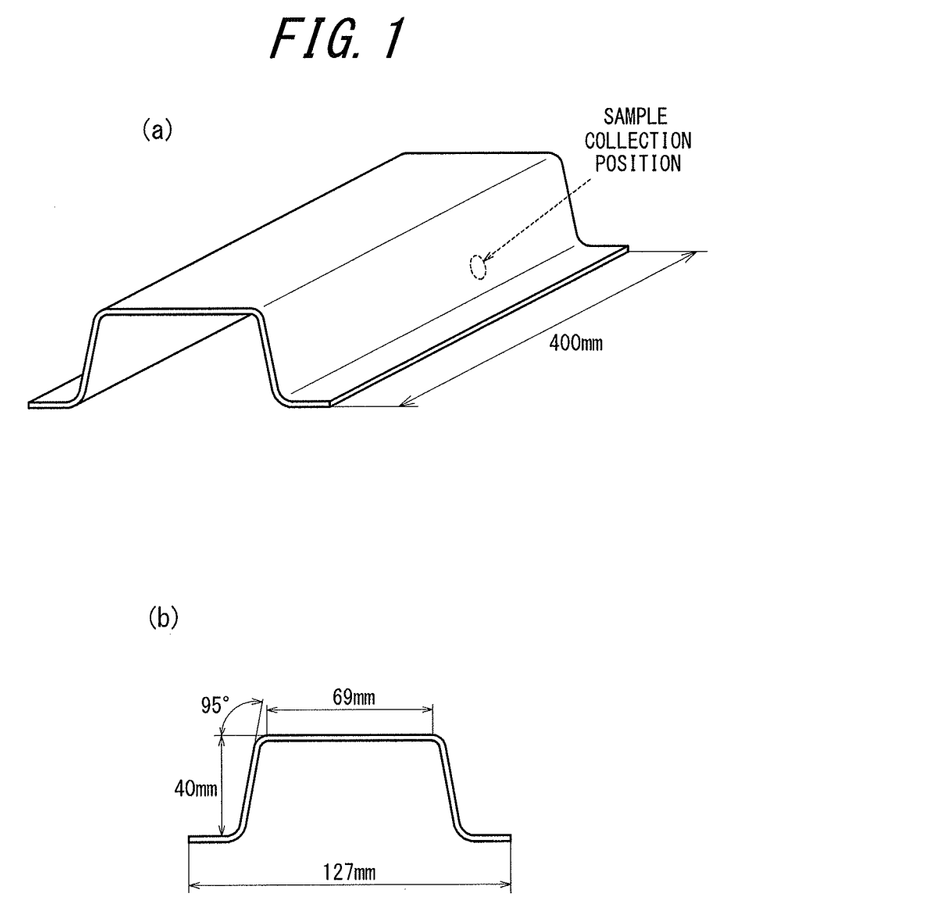
FIG. 1 is a diagram illustrating the shape of a press formed part ((a) is a perspective view, and (b) is a sectional view)

A press forming test was conducted first, using the obtained blank sheet. In detail, the blank sheet was uniformly heated to 900° C., and then allowed to cool to 700° C. At this point, the surface of the blank sheet was cooled under various conditions, and the blank sheet whose surface temperature decreased to 400° C. or less was inserted in a press mold (material: SKD61, shoulder area of punch R: 6 mm, shoulder area of die R: 6 mm) and press formed. After this, the blank sheet was held in the press mold for 15 s to cool to 120° C. or less and released from the press mold, thus obtaining a hat-shaped press formed part illustrated in FIG. 1. The press forming performed was deep drawing with a punch-die clearance of 1.6 mm and a blank holding force of 10 tonf.

Here, the surface of the blank sheet was water-cooled under various conditions by changing the water temperature in the range of 10° C. to 30° C., the density of water quantity in the range of 10 L/m$^2$·min to 100000 L/m$^2$·min, and the time of water injection in the range of 0.1 s to 10.0 s. The press forming load was also measured during the press forming.

A sample was collected from the side wall portion of each obtained hat-shaped press formed part, and the section of its surface layer was observed using a scanning electron microscope (SEM) with 1000 magnification. As a result, microcracks (minute cracking in the surface of the pressed part, which is 30 μm or less in depth from the interface between the coating layer and the steel sheet toward the center in the thickness direction) were not found in any of the conditions with which the surface of the blank sheet was cooled to a temperature of 400° C. or less. However, the press forming load varied in the range of 180 tonf to 600 tonf during press forming, depending on the condition with which the surface of the blank sheet was water-cooled.

Figure 2:
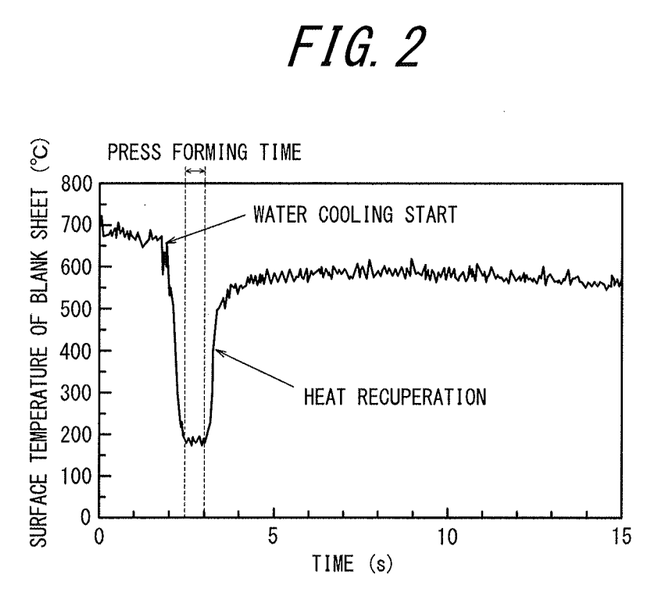
FIG. 2 is a diagram illustrating surface temperature hysteresis in the case of cooling the surface of a coated steel sheet (blank sheet)

In view of this, the same type of blank sheet (200 mm×400 mm) as above was uniformly heated to 900° C., and then allowed to cool to 700° C. At this point, the surface of the blank sheet was cooled under various conditions to be at 400° C. or less, as in the press forming test. After this, the blank sheet was left without being press formed, and the temperature hysteresis of the surface of the blank sheet was measured using a radiation thermometer. As the result, in the case where the blank sheet was water-cooled under the cooling condition, in the press forming test where the press forming load varied in the range of 180 tonf to 600 tonf, corresponding to a relatively low press forming load of 300 tonf or less and then left without being press formed, the following phenomenon was observed as illustrated in FIG. 2: After the surface of the blank sheet was cooled to 400° C. or less during the period corresponding to the press forming time (the time required from when the blank sheet is set in the press mold to when the punch reaches the bottom dead center), the surface temperature of the blank sheet increased to 500° C. or more due to heat recuperation. It can be concluded that, in such a case where the surface temperature significantly increased due to heat recuperation, the inside of the blank sheet was kept at high temperature even though the surface of the blank sheet was cooled to 400° C. or less. On the other hand, in the case where the blank sheet was water-cooled under a water cooling condition corresponding to a relatively high press forming load exceeding 300 tonf and then left without being press formed, the heat recuperation phenomenon was not observed or, even when observed, the temperature increase was small.

These results reveal that, in the case where the press forming load is relatively low, i.e. 300 tonf or less, the surface temperature of the blank sheet during press forming is 400° C. or less and also there is a temperature distribution in the thickness direction of the blank sheet. However, the internal temperature of the blank sheet during press forming in the case where the press forming load is relatively low, i.e. 300 tonf or less, cannot be obtained from these results. Hence, we determined the average temperature of the blank sheet having the temperature distribution by the following method.

The same type of blank sheet (200 mm×400 mm) as above was heated to 900° C., uniformly air-cooled to various temperatures, and press formed. The press forming condition was the same as that of the above-mentioned press forming test, except that the temperature of the blank sheet was uniform throughout the sheet thickness. The press forming load was then measured for each blank sheet temperature during press forming. Here, the blank sheet temperature during press forming was measured from the blank sheet immediately before being inserted into the press mold, using a radiation thermometer. The time required from the measurement of the blank sheet temperature to the press forming is about 1.5 s, and a temperature decrease during this period is negligible.

Figure 3:
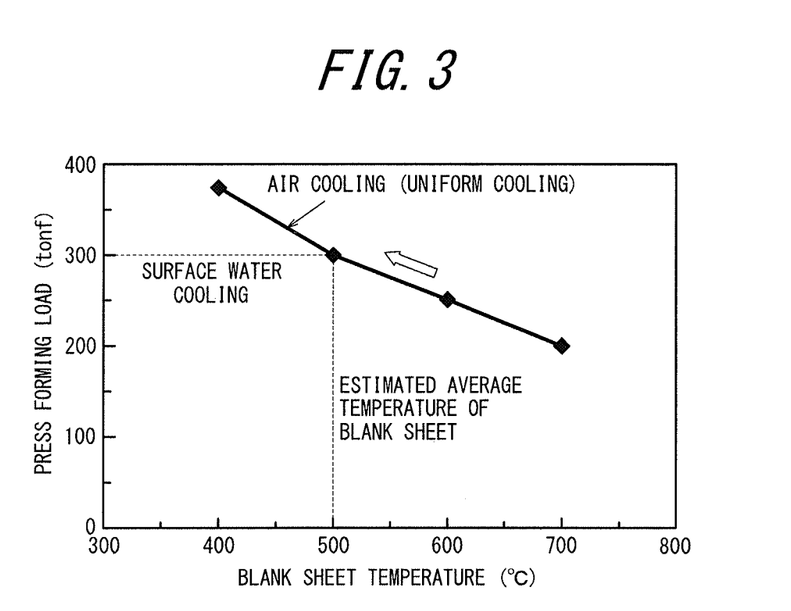
FIG. 3 is a diagram illustrating the relationship between the temperature of the coated steel sheet (blank sheet) and the press forming load.

FIG. 3 is a graph illustrating the relationship between the blank sheet temperature and the press forming load in the case of uniformly cooling the blank sheet. As illustrated in FIG. 3, in the case of uniformly cooling the blank sheet, the press forming load increased as the blank sheet temperature decreased. When the blank sheet temperature was about 500° C. or more, the press forming load was 300 tonf or less. It can be assumed from these results that the average temperature of the blank sheet during press forming is about 500° C. or more in the case where the surface temperature of the blank sheet during press forming is 400° C. or less and the press forming load is 300 tonf or less.

Figure 4:
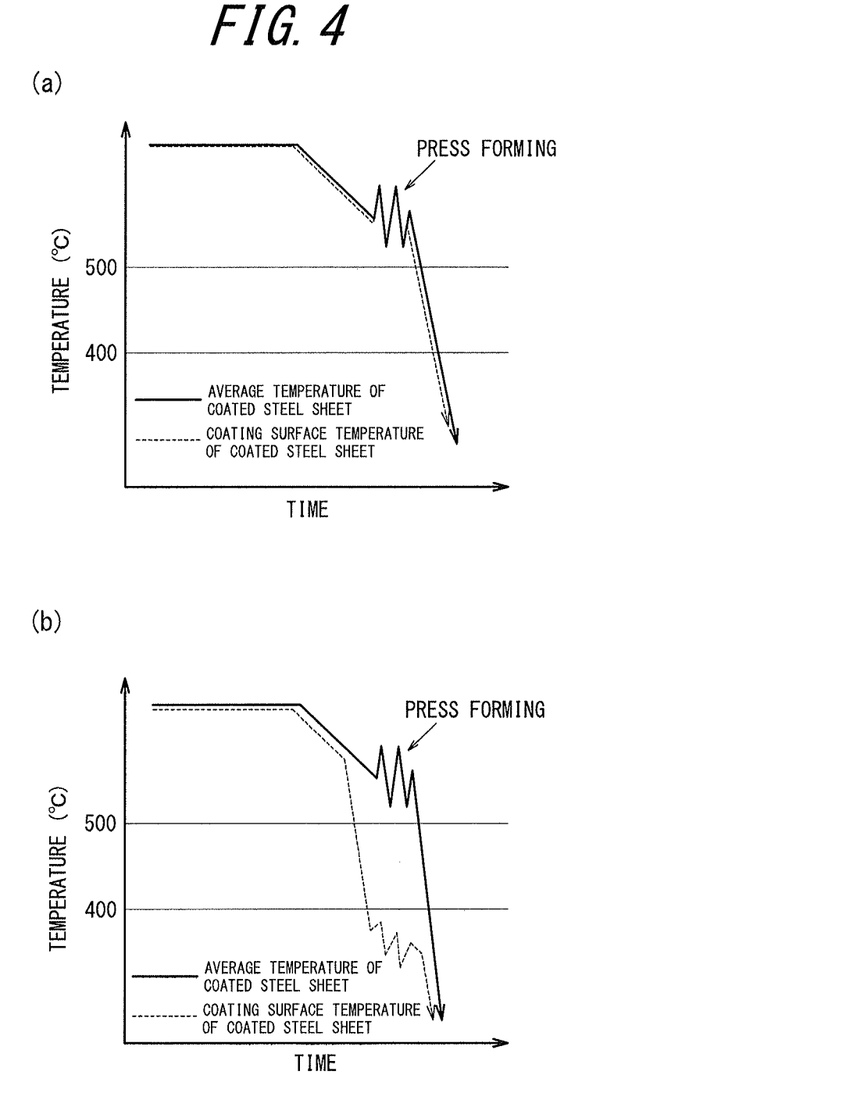

These results reveal that microcracks can be effectively suppressed without an increase in press forming load or a fracture of the blank sheet, by setting the blank sheet temperature during press forming so that the surface temperature is 400° C. or less and the average temperature is 500° C. or more. In a conventional hot press forming method such as the hot press forming method proposed in PTL 3, the blank sheet is press formed under the condition that the blank sheet temperature is uniform throughout the sheet thickness, as illustrated in FIG. 4(a). In such a case, microcracks cannot be sufficiently suppressed, and the characteristics (fatigue resistance, etc.) of the hot press formed part degrade. In the case where the blank sheet having the desired temperature distribution as illustrated in FIG. 4(b) is press formed, on the other hand, microcracks can be suppressed without an increase in press forming load or a fracture of the blank sheet.

As a result of calculating the temperature of the center position of the blank sheet in the thickness direction by heat transfer calculation based on the temperature hysteresis of the surface of the blank sheet illustrated in FIG. 2, the temperature of the center position of the blank sheet in the thickness direction in the period corresponding to the press forming time was presumed at about 530° C. or more. It can therefore be assumed that the same advantageous effects as above are achieved even by setting the blank sheet temperature during press forming so that the temperature of the center position in the thickness direction is 530° C. or more instead of the average temperature being 500° C. or more, as long as the surface temperature is 400° C. or less. Although the finite difference method was used for the heat transfer calculation, the finite element method (FEM) or the like may also be used.

The disclosure is based on the aforementioned discoveries. We thus provide the following.

[1] A method of manufacturing a hot press formed part by hot pressing a coated steel sheet that is obtained by forming a Zn-based coating layer on a surface of a steel sheet, the method including: heating the coated steel sheet to a temperature range of 750° C. or more and 1000° C. or less; cooling a surface of the coated steel sheet; and hot press forming the coated steel sheet under a condition that a surface temperature of the coated steel sheet is 400° C. or less and an average temperature of the coated steel sheet is 500° C. or more.

[2] A method of manufacturing a hot press formed part by hot pressing a coated steel sheet that is obtained by forming a Zn-based coating layer on a surface of a steel sheet, the method including: heating the coated steel sheet to a temperature range of 750° C. or more and 1000° C. or less; cooling a surface of the coated steel sheet; and hot press forming the coated steel sheet under a condition that a surface temperature of the coated steel sheet is 400° C. or less and a temperature of a center position of the coated steel sheet in a thickness direction is 530° C. or more.

[3] The method of manufacturing a hot press formed part according to the foregoing [1] or [2], wherein the coating layer is a Zn—Ni coating layer, and a Ni content in the Zn—Ni coating layer is 9% or more and 25% or less by mass.

[4] The method of manufacturing a hot press formed part according to the foregoing [1] or [2], wherein the coating layer is a Zn—Fe coating layer, and a Fe content in the Zn—Fe coating layer is 5% or more and 80% or less by mass.

[5] The method of manufacturing a hot press formed part according to any of the foregoing [1] to [4], wherein the steel sheet has a chemical composition that includes, in % by mass: 0.15% or more and 0.50% or less C; 0.05% or more and 2.00% or less Si; 0.50% or more and 3.00% or less Mn; 0.10% or less P; 0.050% or less S; 0.0002% or more and 0.0050% or less B; 0.10% or less Al; and 0.010% or less N, with a balance including Fe and incidental impurities.

[6] The method of manufacturing a hot press formed part according to the foregoing [5], wherein the chemical composition further includes, in % by mass, at least one type selected from the group consisting of: 0.01% or more and 0.5% or less Cr; 0.01% or more and 0.5% or less V; 0.01% or more and 0.5% or less Mo; and 0.01% or more and 0.5% or less Ni.

[7] The method of manufacturing a hot press formed part according to the foregoing [5] or [6], wherein the chemical composition further includes, in % by mass, 0.01% or more and 0.20% or less Ti.

[8] The method of manufacturing a hot press formed part according to any of the foregoing [5] to [7], wherein the chemical composition further includes, in % by mass, 0.01% or more and 0.10% or less Nb.

[9] The method of manufacturing a hot press formed part according to any of the foregoing [5] to [8], wherein the chemical composition further includes, in % by mass, 0.003% or more and 0.03% or less Sb.

[10] A hot press formed part manufactured by the method according to any of the foregoing [1] to [9].

Advantageous Effect

It is possible to suppress a conventional problem which is liquid metal embrittlement cracking or minute cracking (microcracks) when manufacturing a hot press formed part by hot pressing a Zn-based coated steel sheet. These problems can be solved without an increase in press forming load or a fracture of the steel sheet during hot press forming. The disclosure thus contributes to improved quality and improved productivity of a hot press formed part having a Zn-based coating layer with excellent corrosion protection on its surface, and has industrially significant effects.

BRIEF DESCRIPTION OF THE DRAWINGS

In the accompanying drawings:

FIG. 4(a) is a diagram illustrating heat hysteresis in a conventional method of manufacturing a hot press formed part, and (b) is a diagram illustrating heat hysteresis in the presented method of manufacturing a hot press formed part;

FIG. 6(a) is a diagram illustrating the result of SEM observation of the section of the surface layer part of a hot press formed part according to a comparative example (part No. 23 in Table 2), and (b) is a diagram illustrating the result of SEM observation of the section of the surface layer part of a hot press formed part according to an inventive example (part No. 14 in Table 2).

DETAILED DESCRIPTION

Detailed description is given below.

The present inventions are: a method of manufacturing a hot press formed part by heating a coated steel sheet obtained by forming a Zn-based coating layer on the surface of a steel sheet, and hot press forming the coated steel sheet into a predetermined part shape using a press mold; and a hot press formed part manufactured by the method. The method includes: heating the coated steel sheet to a temperature range of 750° C. or more and 1000° C. or less; cooling the surface of the coated steel sheet; and hot press forming the coated steel sheet under the condition that the surface temperature of the coated steel sheet is 400° C. or less and the average temperature of the coated steel sheet is 500° C. or more, or under the condition that the surface temperature of the coated steel sheet is 400° C. or less and the temperature of the center position of the coated steel sheet in the thickness direction is 530° C. or more.

Preferably, while hot press forming the coated steel sheet into the desired shape using the press mold, the coated steel sheet is quenched in the press mold by releasing heat. Note, however, that the advantageous effects of the disclosure (such as microcrack suppression) can still be sufficiently achieved without quenching.

The coated steel sheet obtained by forming the Zn-based coating layer on the surface of the steel sheet is used as the raw material of the hot press formed part. The provision of the Zn-based coating layer on the surface of the steel sheet ensures the resistance to oxidation during hot press forming. The provision of the Zn-based coating layer on the surface of the steel sheet also ensures the corrosion resistance of the hot press formed part. While the type of the steel sheet is not particularly limited, the thickness of the steel sheet is preferably 0.8 mm or more and 5.0 mm or less in terms of ensuring the press formability, the rigidity of the hot press formed part, the desired temperature distribution of the steel sheet in hot press forming, and the like.

The type of the Zn-based coating layer is not particularly limited. Inventive examples include a pure Zn coating layer, a Zn—Fe coating layer, and a Zn—Ni coating layer. The method of forming the Zn-based coating layer on the surface of the steel sheet is not particularly limited, and may be any of the methods such as hot dip coating and electroplating. The coating weight per side is preferably 10 g/m² or more and 90 g/m² or less.

In the case where the Zn-based coating layer is a Zn—Fe coating layer, the Fe content in the coating layer, though not particularly limited, is preferably 5% or more and 80% or less by mass. When the Fe content in the coating layer is 5% or more by mass, excellent features specific to Zn—Fe coatings are exhibited. When the Fe content in the coating layer exceeds 80% by mass, corrosion resistance, paint adhesion, weldability, etc. tend to degrade.

In the case where the Zn-based coating layer is a Zn—Ni coating layer, the Ni content in the coating layer is preferably 9% or more and 25% or less by mass. In the case of forming the Zn—Ni coating layer on the surface of the steel sheet by electroplating, a γ phase having any of the crystal structures of $Ni_2Zn_{11}$, $NiZn_3$, and $Ni_5Zn_{21}$ is formed when the Ni content in the coating layer is 9% or more and 25% or less by mass. The γ phase has a high melting point, and so is advantageous in preventing the coating layer from evaporating when heating the coated steel sheet before hot press forming. The γ phase is also advantageous in suppressing liquid metal embrittlement during hot press forming.

The above-mentioned coated steel sheet is heated to a predetermined temperature, cooled only in its surface, and then hot press formed. When the heating temperature of the coated steel sheet is less than 750° C., it is difficult to meet the below-mentioned desired temperature condition of the average temperature of the coated steel sheet or the temperature of the center position of the coated steel sheet in the thickness direction during hot press forming. When the heating temperature of the coated steel sheet exceeds 1000° C., on the other hand, the coating layer evaporates or excessive oxide generation occurs in the surface layer part, as a result of which the resistance to oxidation declines or the corrosion resistance of the hot press formed part declines. The heating temperature is therefore 750° C. or more and 1000° C. or less, and preferably 800° C. or more and 950° C. or less.

In the case where the coated steel sheet is quenched in the press mold by releasing heat while hot press forming the coated steel sheet into the desired shape using the press mold, the heating temperature of the coated steel sheet needs to be not less than the $Ac_1$ transformation temperature of the steel sheet. Moreover, in terms of enhancing the strength of the hot press formed part, it is preferable that the heating temperature of the coated steel sheet is not less than the $Ac_3$ transformation temperature of the steel sheet and the steel sheet is an austenite single phase structure.

The method of heating the coated steel sheet is not particularly limited, and may be any of the methods such as heating in an electric furnace, an induction heating furnace, and a direct current furnace. Here, the coated steel sheet need not be held in the above-mentioned temperature range (750° C. or more and 1000° C. or less) for a given period of time. In other words, the next step (surface cooling step) may be performed immediately after the coated steel sheet is wholly heated to the temperature range. In the case where the coated steel sheet is held in the temperature range (750° C. or more and 1000° C. or less) for a given period of time, the holding time is preferably 1000 s or less.

After heating the coated steel sheet to the temperature range, the surface of the coated steel sheet is cooled, and the coated steel sheet is hot press formed under the condition that the surface temperature of the coated steel sheet is 400° C. or less and the average temperature of the coated steel sheet is 500° C. or more. When the surface temperature of the coated steel sheet during hot press forming exceeds 400° C., microcracks inevitably occur. When the average temperature of the coated steel sheet during hot press forming is less than 500° C., the press forming load increases, or the coated steel sheet breaks easily during press forming. Besides, when the average temperature of the coated steel sheet falls below 500° C. before hot press forming, ferrite or bainite is generated in the steel sheet before the press forming, which may make it impossible to attain sufficient strength after the press forming.

For these reasons, the surface of the coated steel sheet is cooled, and the coated steel sheet is hot press formed under the condition that the surface temperature of the coated steel sheet is 400° C. or less and the average temperature of the coated steel sheet is 500° C. or more. More preferably, the coated steel sheet is hot press formed under the condition that the surface temperature of the coated steel sheet is 350° C. or less and the average temperature of the coated steel sheet is 530° C. or more.

When the surface temperature of the coated steel sheet is less than 150° C., however, the coated steel sheet breaks easily during press forming. Accordingly, the surface temperature of the coated steel sheet is preferably 150° C. or more.

The upper limit of the average temperature of the coated steel sheet may be less than the melting point of the coating, in order to prevent liquid metal embrittlement cracking.

The coated steel sheet may be hot press formed under the condition that the temperature of the center position of the coated steel sheet in the thickness direction during hot press forming is 530° C. or more, instead of the condition that the average temperature of the coated steel sheet during hot press forming is 500° C. or more. By setting the temperature of the center position of the coated steel sheet in the thickness direction during hot press forming to 530° C. or more, the same advantageous effects as in the case where the average temperature is set to 500° C. or more are achieved. The upper limit of the temperature of the center position of the coated steel sheet in the thickness direction may be less than the melting point of the coating, as with the average temperature.

The surface temperature of the coated steel sheet may be measured, for example, using a radiation thermometer. The average temperature of the coated steel sheet may be predicted, for example, from the press forming load during hot press forming.

When the temperature of the steel sheet to be formed is higher, the strength of the steel sheet is lower, and so the press forming load necessary for hot press forming decreases. When the temperature of the steel sheet to be formed is lower, the strength of the steel sheet is higher, and so the press forming load necessary for hot press forming increases. Thus, the correlation between the temperature of the coated steel sheet and the press forming load during hot press forming can be analyzed beforehand by, after heating the coated steel sheet, uniformly cooling the coated steel sheet (cooling to uniform temperature throughout the sheet thickness) to various temperatures and hot press forming the coated steel sheet. Then, the coated steel sheet having the temperature distribution in the thickness direction as a result of being cooled only in the surface is hot press formed, and the press forming load measured at this time is assigned to the correlation analyzed beforehand. The temperature of the coated steel sheet obtained as a result of the assignment can be regarded as the average temperature of the coated steel sheet during hot press forming.

The temperature of the center position of the coated steel sheet in the thickness direction may be determined, for example, by heat transfer calculation according to the finite element method or the finite difference method. The average temperature of the coated steel sheet may be equally determined by heat transfer calculation according to the finite element method or the finite difference method, instead of being predicted from the press forming load as mentioned above.

The method of cooling the surface of the coated steel sheet is not particularly limited. Any of the cooling methods such as water cooling, mist cooling, cooling by high pressure gas, and cooling by press mold contact is applicable as long as the coated steel sheet having the desired temperature distribution (the surface temperature is 400° C. or less, and the average temperature is 500° C. or more or the temperature of the center position in the thickness direction is 530° C. or more) is obtained.

In the case of water-cooling the surface of the coated steel sheet, for example, the coated steel sheet having the desired temperature distribution is obtained by appropriately adjusting the water temperature in the range of 10° C. to 30° C., the density of water quantity in the range of 500 L/m²·min to 100000 L/m²·min, and the time of water injection in the range of 0.1 s to 3.0 s, depending on the heating temperature of the coated steel sheet or the like.

In the case of mist-cooling the surface of the coated steel sheet, for example, the coated steel sheet having the desired temperature distribution is obtained by appropriately adjusting the ratio of the air flow rate to the water flow rate (at ordinary temperature and pressure) in the range of 10 to 10000, the water temperature in the range of 10° C. to 30° C., the airflow density in the range of 0.5 Nm³/m²·s to 2 Nm³/m²·s, and the spray time in the range of 0.1 s to 3.0 s, depending on the heating temperature of the coated steel sheet or the like.

In the case of cooling the surface of the coated steel sheet by high pressure gas, for example, the coated steel sheet having the desired temperature distribution is obtained by spraying the coated steel sheet with $H_2$ gas, $N_2$ gas, He gas, or the like at high pressure of 1 atm to 3 atm. For example, this may be performed by appropriately adjusting the gas spray quantity in the range of 1.0 Nm³/m²·s to 30 Nm³/m²·s and the gas spray time in the range of 0.5 s to 5.0 s, depending on the heating temperature of the coated steel sheet or the like.

Since the cooling condition for realizing the desired temperature distribution of the coated steel sheet differs depending on factors such as the thickness of the coated steel sheet, the heating temperature, and the time required from when the surface of the coated steel sheet is cooled to when the coated steel sheet is hot press formed, predicting the optimum cooling condition tends to be difficult. It is therefore preferable to conduct preliminary experiments for various cases (the thickness of the coated steel sheet, etc.) and determine the optimum cooling condition for each case beforehand.

For example, consider the case of using a blank sheet taken from a coated steel sheet that is obtained by forming a Zn-based coating layer (Zn-12% by mass Ni coating, coating weight per side: 65 g/m²) on the surface of a steel sheet which is a cold rolled steel sheet (chemical composition (% by mass): Fe-0.23% C-0.25% Si-1.40% Mn-0.01% P-0.005% S-0.0020% B-0.03% Al-0.005% N, $Ac_3$ transformation temperature: 801° C.) with a thickness of 1.6 mm. By cooling the surface of this blank sheet under the following condition, the desired temperature distribution (the surface temperature is 400° C. or less, and the average temperature is 500° C. or more or the temperature of the center position in the thickness direction is 530° C. or more) is obtained.

The blank sheet is uniformly heated to 900° C., and allowed to cool to 700° C. The surface of the blank sheet is then water-cooled under the condition that the water temperature is 10° C., the density of water quantity is 10000 L/m²·min, and the time of water injection is 0.3 s, thus decreasing the surface temperature to 250° C. The desired temperature distribution is obtained in this way.

As described above, by cooling the surface of the coated steel sheet after heating and hot press forming the coated steel sheet under the condition that the surface temperature of the coated steel sheet is 400° C. or less and the average temperature of the coated steel sheet is 500° C. or more, microcracks can be suppressed without an increase in press forming load or a fracture of the steel sheet during hot press forming. The same advantageous effects can be achieved even under the condition that the temperature of the center position of the coated steel sheet in the thickness direction is 530° C. or more, instead of the condition that the average temperature of the coated steel sheet is 500° C. or more. While the thickness of the steel sheet is about 0.8 mm to 5.0 mm, the thickness of the coating layer is extremely thin, i.e. about 5 μm to 20 μm. It is therefore assumed that the temperature near the interface between the coating layer and the steel sheet is approximately equal to the surface temperature of the coated steel sheet during hot press forming.

After hot press forming the coated steel sheet, the formed part may be released from the press mold immediately, or held in the press mold for a predetermined time to make the steel sheet as a quenched structure. In the case where the steel sheet is quenched after hot press forming to enhance the strength of the hot press formed part, the hot press formed part is preferably held in the press mold for 5 s or more so that the temperature of the steel sheet after the hot press forming is 150° C. or less. The cooling rate of the steel sheet in the press mold is preferably 30° C./s or more. The cooling rate can be regulated as desired, for example, by selecting the material or mass (thermal conductivity or heat capacity) of the press mold depending on the dimensions of the blank sheet (coated steel sheet) or the like and adjusting heat release performance, or by using a press mold having a cooling function (for example, a press mold including a path for a coolant such as water).

In the case where the hot press formed part is held in the press mold for the predetermined time to make the steel sheet as a quenched structure in order to enhance the strength of the hot press formed part, for example, a hot rolled steel sheet or cold rolled steel sheet having a chemical composition that includes, in % by mass: 0.15% or more and 0.50% or less C; 0.05% or more and 2.00% or less Si; 0.50% or more and 3.00% or less Mn; 0.10% or less P; 0.050% or less S; 0.0002% or more and 0.0050% or less B; 0.10% or less Al; and 0.010% or less N, with the balance including Fe and incidental impurities may be used as the steel sheet. The reasons of limitation of each component are given below. Here, "%" indicating the content of each component is "% by mass", unless otherwise stated.

C: 0.15% or more and 0.50% or less

C is an element that improves the strength of steel. To enhance the strength of the hot press formed part, the C content is preferably 0.15% or more. When the C content exceeds 0.50%, on the other hand, the weldability of the hot press formed part and the blanking workability of the raw material (steel sheet) decrease significantly. Accordingly, the C content is preferably 0.15% or more and 0.50% or less, and more preferably 0.20% or more and 0.40% or less.

Si: 0.05% or more and 2.00% or less

Si is an element that improves the strength of steel, as with C. To enhance the strength of the hot press formed part, the Si content is preferably 0.05% or more. When the Si content exceeds 2.00%, on the other hand, a surface defect called red oxide scale increases significantly during hot rolling when manufacturing the steel sheet. Accordingly, the Si content is preferably 0.05% or more and 2.00% or less, and more preferably 0.10% or more and 1.50% or less.

Mn: 0.50% or more and 3.00% or less

Mn is an element that enhances the quench hardenability of steel, and is effective in suppressing the ferrite transformation of the steel sheet and obtaining a quenched structure in the cooling process after the hot press forming. Mn also has a function of decreasing the $Ac_3$ transformation temperature of steel, and so is an element effective in lowering the heating temperature of the coated steel sheet before the hot press forming. To achieve these effects, the Mn content is preferably 0.50% or more. When the Mn content exceeds 3.00%, on the other hand, Mn segregates and the uniformity of the material characteristics of the steel sheet and hot press formed part declines. Accordingly, the Mn content is preferably 0.50% or more and 3.00% or less, and more preferably 0.75% or more and 2.50% or less.

P: 0.10% or less

When the P content exceeds 0.10%, P segregates to grain boundaries, and the low temperature toughness of the steel sheet and hot press formed part decreases. Accordingly, the P content is preferably 0.10% or less, and more preferably 0.01% or less. Excessively reducing P, however, leads to higher cost in the steelmaking process. Hence, the P content is preferably 0.001% or more.

S: 0.050% or less

S is an element that forms a coarse sulfide by combining with Mn and causes a decrease in ductility of steel. The S content is preferably reduced as much as possible, though up to 0.050% is allowable. Accordingly, the S content is preferably 0.050% or less, and more preferably 0.010% or less. Excessively reducing S, however, leads to higher cost of desulfurization in the steelmaking process. Hence, the S content is preferably 0.0005% or more.

B: 0.0002% or more and 0.0050% or less

B is an element that enhances the quench hardenability of steel, and is effective in suppressing the generation of ferrite from austenite grain boundaries and obtaining a quenched structure when cooling the steel sheet after the hot press forming. This effect is achieved when the B content is 0.0002% or more. When the B content exceeds 0.0050%, however, the effect saturates and the cost increases. Accordingly, the B content is preferably 0.0002% or more and 0.0050% or less, and more preferably 0.0005% or more and 0.0030% or less.

Al: 0.10% or less

When the Al content exceeds 0.10%, oxide inclusions in steel increase, and the ductility of steel declines. Accordingly, the Al content is preferably 0.10% or less, and more preferably 0.07% or less. Meanwhile, Al functions as a deoxidizer, and so the Al content is preferably 0.01% or more to improve the cleanliness of steel.

N: 0.010% or less

When the N content exceeds 0.010%, Al nitride forms in the steel sheet, which causes lower formability during hot press forming. Accordingly, the N content is preferably 0.010% or less, and more preferably 0.005% or less. Excessively reducing the N content, however, leads to higher cost in the steelmaking process. Hence, the N content is preferably 0.0005% or more.

These are the preferable basic components of the steel sheet. The steel sheet may further include the following elements when necessary.

At least one type selected from the group consisting of Cr: 0.01% or more and 0.5% or less, V: 0.01% or more and 0.5% or less, Mo: 0.01% or more and 0.5% or less, and Ni: 0.01% or more and 0.5% or less Cr, V, Mo, and Ni are each an element effective in enhancing the quench hardenability of steel. This effect is achieved when the content is 0.01% or more for each of the elements. When the content exceeds 0.5% for each of Cr, V, Mo, and Ni, however, the effect saturates and the cost increases. Accordingly, in the case where at least one type of Cr, V, Mo, and Ni is included, the content is preferably 0.01% or more and 0.5% or less, and more preferably 0.1% or more and 0.4% or less.

Ti: 0.01% or more and 0.20% or less

Ti is an element effective in strengthening steel. The strengthening effect of Ti is achieved when the content is 0.01% or more. Ti within the specified range can be used to strengthen steel without any problem. When the Ti content exceeds 0.20%, however, the effect saturates and the cost increases. Accordingly, in the case where Ti is included, the content is preferably 0.01% or more and 0.20% or less, and more preferably 0.01% or more and 0.05% or less.

Nb: 0.01% or more and 0.10% or less

Nb is an element effective in strengthening steel, too. The strengthening effect of Nb is achieved when the content is 0.01% or more. Nb within the specified range can be used to strengthen steel without any problem. When the Nb content exceeds 0.10%, however, the effect saturates and the cost increases. Accordingly, in the case where Nb is included, the content is preferably 0.01% or more and 0.10% or less, and more preferably 0.01% or more and 0.05% or less.

Sb: 0.003% or more and 0.03% or less

Sb has an effect of suppressing a decarburized layer generated in the surface layer part of the steel sheet from when the coated steel sheet is heated before the hot press forming to when the coated steel sheet is cooled by the process of hot press forming. To achieve this effect, the Sb content is preferably 0.003% or more. When the Sb content exceeds 0.03%, however, the rolling load increases during steel sheet manufacture, which may cause lower productivity. Accordingly, in the case where Sb is included, the content is preferably 0.003% or more and 0.03% or less, and more preferably 0.005% or more and 0.01% or less.

The components (balance) other than the above are Fe and incidental impurities.

The coated steel sheet that uses the steel sheet having the above-mentioned composition is, prior to hot press forming, heated to a temperature not less than the $Ac_3$ transformation temperature of the steel sheet. The coated steel sheet is then hot press formed under the desired temperature condition. After this, the coated steel sheet is held in the press mold for 5 s or more to cool the steel sheet to 150° C. or less at a cooling rate of 30° C./s or more. The structure of the steel sheet can thus be made as a martensite structure. As a result, a hot press formed part having excellent corrosion resistance and tensile strength of 1300 MPa or more is obtained.

The presented hot press forming method can suppress liquid metal embrittlement cracking and minute cracking (microcracks) without an increase in press forming load or a fracture of the steel sheet, even in the case where the method is applied to a steel sheet which typically has high strength and is difficult to be formed. Thus, the presented hot press forming method is advantageously applied to a high-strength steel sheet having the above-mentioned chemical composition.

The manufacturing condition of the coated steel sheet used as the raw material of the hot press formed part is not particularly limited. The manufacturing condition of the steel sheet is not particularly limited in the present invention. For example, a hot rolled steel sheet (pickled steel sheet, thickness: about 2.0 mm or more and 5.0 mm or less) having a predetermined chemical composition may be used as the steel sheet. A cold rolled steel sheet (thickness: about 0.8 mm or more and 2.3 mm or less) obtained by cold rolling the hot rolled steel sheet (pickled steel sheet) may also be used as the steel sheet.

The condition when forming the Zn-based coating layer on the surface of the steel sheet to obtain the coated steel sheet is not particularly limited. In the case where a hot rolled steel sheet (pickled steel sheet) is used as the steel sheet, the coated steel sheet may be obtained by subjecting the hot rolled steel sheet (pickled steel sheet) to annealing treatment and hot-dip galvanizing treatment. Alloying treatment may be further performed following the hot-dip galvanizing treatment to obtain the coated steel sheet. Alternatively, the coated steel sheet may be obtained by subjecting the hot rolled steel sheet (pickled steel sheet) to Zn electroplating treatment. In the case where a cold rolled steel sheet is used as the steel sheet, the coated steel sheet may be obtained by subjecting the cold rolled steel sheet to annealing treatment and then hot-dip galvanizing treatment. Alloying treatment may be further performed following the hot-dip galvanizing treatment to obtain the coated steel sheet. Alternatively, the coated steel sheet may be obtained by subjecting the cold rolled steel sheet to Zn electroplating treatment. Annealing treatment may be performed on the cold rolled steel sheet before the Zn electroplating treatment.

In the case of forming a hot-dip galvanized coating layer on the surface of the steel sheet, for example, the hot-dip galvanized coating layer may be formed by passing the steel sheet through a continuous galvanizing line to perform annealing treatment, and then immersing the steel sheet into a galvanizing bath of 440° C. or more and 500° C. or less. The coating weight of the hot-dip galvanized coating layer may be adjusted to a desired coating weight (for example, 10 g/m² or more and 90 g/m² or less per side) by gas wiping or the like.

In the case of forming a Zn—Fe coating layer on the surface of the steel sheet, for example, the Zn—Fe coating layer may be formed by, after forming a Zn coating layer on the surface of the steel sheet by the same method as above, subjecting the steel sheet to alloying treatment of heating to a temperature range of 460° C. or more and 600° C. or less in an alloying furnace and holding in the temperature range for 5 s or more and 60 s or less. The Fe content in the coating layer may be set to a desired Fe content (for example, 5% or more and 80% or less by mass) by appropriately adjusting the heating temperature in the alloying furnace or the holding time at the heating temperature within the above-mentioned range.

In the case of forming a Zn—Ni coating layer on the surface of the steel sheet, for example, the Zn—Ni coating layer may be formed by degreasing and pickling the steel sheet, and then subjecting the steel sheet to electroplating treatment with a current density of 10 A/dm² or more and 150 A/dm² or less in a plating bath having a pH of 1.0 or more and 3.0 or less and a bath temperature of 30° C. or more and 70° C. or less and containing: 100 g/L or more and 400 g/L or less nickel sulfate hexahydrate; and 10 g/L or more and 400 g/L or less zinc sulfate heptahydrate. In the case where a cold rolled steel sheet is used as the steel sheet, the cold rolled steel sheet may be subject to annealing treatment before degreasing and pickling. The Ni content in the coating layer may be set to a desired Ni content (for example, 9% or more and 25% or less by mass) by appropriately adjusting the concentration of the zinc sulfate heptahydrate or the current density within the above-mentioned range. The coating weight of the Zn—Ni coating layer may be set to a desired coating weight (for example, 10 g/m² or more and 90 g/m² or less per side) by adjusting the current passage time.

EXAMPLES

Steels having the compositions shown in Table 1 were each smelted into a casting slab, and the casting slab was heated to 1200° C., hot rolled at a finisher delivery temperature of 870° C., and coiled at 600° C. to obtain a hot rolled steel sheet. The hot rolled steel sheet was then pickled and cold rolled with a rolling reduction ratio of 65%, to obtain a cold rolled steel sheet with a thickness of 1.6 mm. The $Ac_3$ transformation temperature in Table 1 was calculated according to the following Formula (1) (see William C. Leslie, The Physical Metallurgy of Steels, translation supervised by Nariyasu Kouda, translated by Hiroshi Kumai and Tatsuhiko Noda, Maruzen Co., Ltd., 1985, p. 273).

$$Ac_3(° C.)=910-203\sqrt{[C]}+44.7\times[Si]-30\times[Mn]+700\times[P]+400\times[Al] \quad (1)$$

where [C], [Si], [Mn], [P], and [Al] are the contents (% by mass) of the respective elements (C, Si, Mn, P, and Al).

Using the cold rolled steel sheet obtained as described above as a steel sheet, each of a pure Zn coating layer, a Zn—Fe coating layer (Fe content: 8% to 70% by mass), and a Zn—Ni coating layer (Ni content: 10% to 23% by mass) was formed on the surface of the steel sheet to obtain a coated steel sheet. Each coating layer was formed under the following condition.

<Pure Zn Coating Layer>

The cold rolled steel sheet was passed through a continuous galvanizing line, heated to a temperature range of 800° C. or more and 900° C. or less at a heating rate of 10° C./s, and held in the temperature range for 10 s or more and 120 s or less. After this, the cold rolled steel sheet was cooled to a temperature range of 460° C. or more and 500° C. or less at a cooling rate of 15° C./s, and immersed into a galvanizing bath of 450° C. to form a Zn coating layer. The coating weight of the Zn coating layer was adjusted to a predetermined coating weight by gas wiping.

<Zn—Fe Coating Layer>

The cold rolled steel sheet was passed through a continuous galvanizing line, heated to a temperature range of 800° C. or more and 900° C. or less at a heating rate of 10° C./s, and held in the temperature range for 10 s or more and 120 s or less. After this, the cold rolled steel sheet was cooled to a temperature range of 460° C. or more and 500° C. or less at a cooling rate of 15° C./s, and immersed into a galvanizing bath of 450° C. to form a Zn coating layer. The coating weight of the Zn coating layer was adjusted to a predetermined coating weight by gas wiping. Immediately after adjusting the Zn coating layer to the predetermined coating weight by gas wiping, the cold rolled steel sheet was heated to 500° C. to 550° C. in an alloying furnace and held for 5 s to 60 s, to form a Zn—Fe coating layer. The Fe content in the coating layer was set to a predetermined content by changing the heating temperature in the alloying furnace or the holding time at the heating temperature within the above-mentioned range.

<Zn—Ni Coating Layer>

The cold rolled steel sheet was passed through a continuous annealing line, heated to a temperature range of 800° C. or more and 900° C. or less at a heating rate of 10° C./s, and held in the temperature range for 10 s or more and 120 s or less. After this, the cold rolled steel sheet was cooled to a temperature range of 400° C. or more and 500° C. or less at a cooling rate of 15° C./s. The cold rolled steel sheet was then degreased and pickled, and subject to electroplating treatment of applying current for 10 s to 100 s with a current density of 30 A/dm² to 100 A/dm² in a plating bath having a pH of 1.3 and a bath temperature of 50° C. and containing: 200 g/L nickel sulfate hexahydrate; and 10 g/L to 300 g/L zinc sulfate heptahydrate, thus forming a Zn—Ni coating layer. The Ni content in the coating layer was set to a predetermined content by appropriately adjusting the concentration of the zinc sulfate heptahydrate or the current density within the above-mentioned range. The coating weight of the Zn—Ni coating layer was set to a predetermined coating weight by appropriately adjusting the current passage time in the above-mentioned range.

A blank sheet of 200 mm×400 mm was punched from each coated steel sheet obtained as described above, and heated in an electric furnace having an air atmosphere. The surface of the blank sheet was then cooled, and the blank sheet was press formed using a press mold (material: SKD61). After this, the blank sheet was cooled in the press mold and released from the press mold, thus manufacturing a hat-shaped press formed part illustrated in FIG. 1. The press forming performed was deep drawing with a punch-die clearance of 1.6 mm and a blank holding force of 10 tonf, using a press mold with a shoulder area of punch R: 6 mm and a shoulder area of die R: 6 mm.

The heating temperature of the blank sheet, the holding time at the heating temperature, the method of cooling the surface of the blank sheet, the surface temperature, average temperature, and temperature of the center position in the thickness direction of the blank sheet at the start of press forming, the press forming load, the holding time in the press mold (the holding time at the bottom dead center position of the press mold), and the mold release temperature after press forming are shown in Table 2.

The cooling before press forming was performed by water-cooling the surface of the blank sheet or cooling the surface of the blank sheet by high pressure gas in the state of setting the blank sheet in the press mold. Here, the water quantity and the water pressure during water cooling or the gas temperature and the gas pressure during cooling by high pressure gas were appropriately adjusted so that the surface temperature and average temperature or temperature in the center position in the thickness direction of the blank sheet after cooling, i.e. the blank sheet during press forming, were within the target range. In Table 2, in the inventive examples involving water cooling, the water cooling condition was appropriately adjusted so that the water temperature was in the range of 10° C. to 30° C., the density of water quantity was in the range of 500 L/m²·min to 100000 L/m²·min, and the time of water injection was in the range of 0.1 s to 3.0 s, to realize the desired surface temperature and average temperature or temperature in the center position in the thickness direction. In the inventive examples involving high pressure gas cooling, on the other hand, the high pressure gas cooling condition was appropriately adjusted so that the gas spray quantity was in the range of 1.0 Nm³/m²·s to 30 Nm³/m²·s and the gas spray time was in the range of 0.5 s to 5.0 s when spraying $N_2$ gas, $H_2$ gas, or He gas to the surface of the blank sheet at high pressure of 1 atm to 3 atm, to realize the desired surface temperature and average temperature or temperature in the center position in the thickness direction.

The surface temperature of the blank sheet before pressing was measured using a radiation thermometer. The time required from the measurement of the surface temperature of the blank sheet to the press forming was about 1.5 s. The average temperature of the blank sheet during press forming was predicted from the press forming load according to the above-mentioned method. In detail, the average temperature of the blank sheet was predicted from the press forming load in this inventive example, based on the correlation between the blank sheet and the press forming load determined by heating the blank sheet to about 900° C., uniformly cooling the blank sheet by air until the forming start, and press forming the blank sheet at various temperatures.

Figure 5:
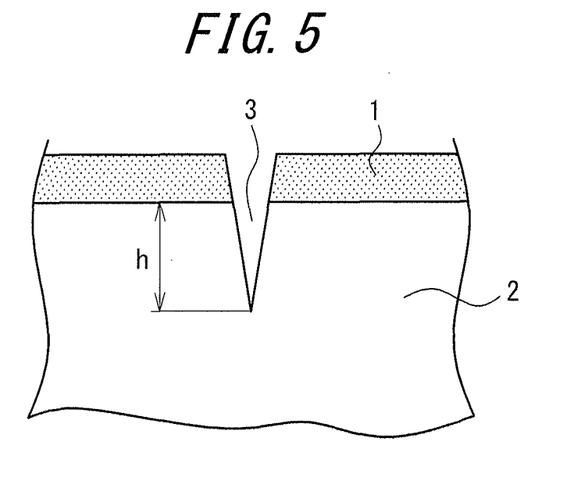
FIG. 5 is a diagram schematically illustrating a microcrack in the surface of a press formed part.

The temperature of the center position of the blank sheet in the thickness direction during press forming was determined by heat transfer calculation according to the finite element method A sample was collected from the side wall portion of each obtained hat-shaped press formed part, and the section of its surface layer was observed using a scanning electron microscope (SEM) with 1000 magnification for 10 fields or more per sample, to examine the presence or absence of microcracks (minute cracking in the surface of the sample, which is 30 μm or less in depth from the interface between the coating layer and the steel sheet, and passes through the interface between the coating layer and the steel sheet and reaches the inside of the steel sheet) and the average depth of microcracks. The average depth of microcracks was calculated by averaging the microcrack depths of any 20 microcracks. The microcrack depth mentioned here means the length (length h in FIG. 5) of a microcrack 3 measured from the interface between a coating layer 1 and a steel sheet 2 toward the center in the thickness direction, as illustrated in FIG. 5. In the case where the number of microcracks observed was less than 20, the depths of all observed microcracks were averaged as the average depth. The presence or absence of cracking (cracking in the surface of the sample, which exceeds 30 μm in depth from the interface between the coating layer and the steel sheet) other than microcracks was also examined.

Moreover, the section of each obtained sample (sample collected from the side wall portion of each hat-shaped press formed part) was polished, and the hardness of the center position of the sample in the thickness direction was measured using a micro-Vickers hardness meter. These results are also shown in Table 2.

Furthermore, a JIS No. 13 B tensile test piece was collected from the side wall portion of each obtained press formed part. A tensile test was conducted using the collected test piece according to JIS G 0567 (1998), to measure the tensile strength at room temperature (22±5° C.). The tensile test was conducted at a crosshead speed of 10 mm/min. These results are also shown in Table 2.

TABLE 1

| Steel sample ID | Chemical composition (mass %) | | | | | | | | | | | | | | | $Ac_3$ transformation temperature (° C.) |
|---|---|---|---|---|---|---|---|---|---|---|---|---|---|---|---|---|
| | C | Si | Mn | P | S | B | Al | N | Cr | V | Mo | Ni | Ti | Nb | Sb | |
| A | 0.23 | 0.25 | 1.40 | 0.01 | 0.005 | 0.0020 | 0.03 | 0.005 | — | — | — | — | — | — | — | 801 |
| B | 0.31 | 0.45 | 1.20 | 0.02 | 0.008 | 0.0030 | 0.02 | 0.003 | — | — | — | — | — | — | — | 803 |
| C | 0.19 | 1.20 | 2.12 | 0.01 | 0.003 | 0.0020 | 0.03 | 0.003 | — | — | — | — | — | — | — | 831 |
| D | 0.21 | 0.62 | 1.55 | 0.01 | 0.002 | 0.0040 | 0.03 | 0.004 | — | — | — | — | — | — | — | 817 |
| E | 0.25 | 0.15 | 0.86 | 0.02 | 0.003 | 0.0030 | 0.04 | 0.003 | — | — | — | — | — | — | — | 819 |

TABLE 1-continued

| Steel sample ID | Chemical composition (mass %) | | | | | | | | | | | | | | | Ac₃ transformation temperature (° C.) |
|---|---|---|---|---|---|---|---|---|---|---|---|---|---|---|---|---|
| | C | Si | Mn | P | S | B | Al | N | Cr | V | Mo | Ni | Ti | Nb | Sb | |
| F | 0.24 | 0.30 | 1.30 | 0.01 | 0.004 | 0.0050 | 0.03 | 0.004 | 0.3 | — | — | — | — | — | — | 804 |
| G | 0.21 | 0.22 | 1.64 | 0.02 | 0.005 | 0.0020 | 0.04 | 0.003 | — | — | — | — | 0.02 | — | — | 808 |
| H | 0.22 | 0.15 | 1.44 | 0.01 | 0.003 | 0.0030 | 0.02 | 0.004 | — | — | — | — | — | — | 0.007 | 786 |

TABLE 2

| Part No. | Steel sample ID | Coating layer | | Heating condition | | Surface cooling method before press forming *2 | Press forming condition | | |
|---|---|---|---|---|---|---|---|---|---|
| | | | | | | | Press forming start temperature (° C.) | | |
| | | Type | Coating weight (g/m²) *1 | Heating temperature (° C.) | Holding time (s) | | Surface temperature *3 | Average temperature *4 | Temperature of thickness center position *5 |
| 1 | A | Zn | 55 | 900 | 120 | Water cooling | 390 | 570 | 605 |
| 2 | A | | 45 | 890 | 150 | Water cooling | 203 | 620 | 691 |
| 3 | A | | 70 | 920 | 90 | High pressure gas cooling | 343 | 710 | 758 |
| 4 | A | | 55 | 900 | 120 | Water cooling | 480 | 683 | 718 |
| 5 | A | | 45 | 890 | 150 | High pressure gas cooling | 552 | 701 | 732 |
| 6 | A | Zn-12% Fe | 45 | 880 | 60 | Water cooling | 305 | 590 | 631 |
| 7 | A | Zn-8% Fe | 60 | 900 | 120 | Water cooling | 195 | 636 | 696 |
| 8 | A | Zn-70% Fe | 35 | 850 | 90 | High pressure gas cooling | 270 | 672 | 722 |
| 9 | A | Zn-40% Fe | 50 | 880 | 30 | High pressure gas cooling | 320 | 700 | 749 |
| 10 | A | Zn-25% Fe | 40 | 890 | 60 | Water cooling | 250 | 663 | 714 |
| 11 | A | Zn-12% Fe | 45 | 880 | 60 | Water cooling | 322 | 350 | 372 |
| 12 | A | Zn-8% Fe | 60 | 900 | 120 | Water cooling | 265 | 470 | 505 |
| 13 | A | Zn-40% Fe | 50 | 850 | 90 | High pressure gas cooling | 585 | 672 | 699 |
| 14 | A | Zn-12% Ni | 65 | 900 | 30 | Water cooling | 360 | 530 | 563 |
| 15 | A | Zn-10% Ni | 45 | 880 | 60 | Water cooling | 330 | 680 | 726 |
| 16 | A | Zn-23% Ni | 30 | 840 | 90 | High pressure gas cooling | 365 | 710 | 756 |
| 17 | A | Zn-16% Ni | 50 | 920 | 40 | High pressure gas cooling | 293 | 649 | 696 |
| 18 | B | Zn-14% Ni | 45 | 880 | 50 | Water cooling | 230 | 655 | 707 |
| 19 | C | Zn-11% Ni | 55 | 900 | 30 | Water cooling | 325 | 550 | 587 |
| 20 | D | Zn-12% Ni | 60 | 910 | 5 | High pressure gas cooling | 348 | 675 | 720 |
| 21 | E | Zn-15% Ni | 35 | 870 | 120 | High pressure gas cooling | 290 | 640 | 686 |
| 22 | A | Zn-12% Ni | 65 | 900 | 30 | Water cooling | 537 | 660 | 689 |
| 23 | A | Zn-10% Ni | 45 | 880 | 60 | High pressure gas cooling | 620 | 712 | 739 |
| 24 | A | Zn-23% Ni | 30 | 840 | 90 | Water cooling | 216 | 430 | 466 |
| 25 | A | Zn-16% Ni | 50 | 920 | 40 | Water cooling | 122 | 202 | 228 |
| 26 | F | Zn-13% Ni | 50 | 900 | 10 | Water cooling | 370 | 630 | 720 |
| 27 | G | Zn-15% Ni | 60 | 900 | 30 | Water cooling | 280 | 590 | 614 |
| 28 | H | Zn-12% Ni | 45 | 900 | 5 | Water cooling | 330 | 650 | 692 |

| Part No. | Press forming condition | | | Press formed part | | | | |
|---|---|---|---|---|---|---|---|---|
| | | | | Microcrack | | | | |
| | Press forming load (tonf) | Bottom dead center holding time (s) | Mold release temperature (° C.) | Presence of absence of crack | Average crack depth (μm) | Hardness of thickness center position (Hv) | Tensile strength (MPa) | Remarks |
| 1 | 285 | 10 | 70 | Absence | — | 470 | 1490 | Inventive Example |
| 2 | 279 | 15 | 78 | Absence | — | 483 | 1525 | Inventive Example |
| 3 | 230 | 12 | 92 | Absence | — | 495 | 1543 | Inventive Example |
| 4 | 243 | 10 | 93 | Presence | 8 | 463 | 1470 | Comparative Example |
| 5 | 234 | 15 | 88 | Presence | 23 | 455 | 1455 | Comparative Example |
| 6 | 271 | 12 | 113 | Absence | — | 476 | 1510 | Inventive Example |

TABLE 2-continued

| | | | | | | | | |
|---|---|---|---|---|---|---|---|---|
| 7 | 245 | 8 | 94 | Absence | — | 456 | 1450 | Inventive Example |
| 8 | 227 | 10 | 86 | Absence | — | 463 | 1470 | Inventive Example |
| 9 | 213 | 15 | 74 | Absence | — | 476 | 1508 | Inventive Example |
| 10 | 231 | 12 | 88 | Absence | — | 471 | 1493 | Inventive Example |
| 11 | 448 | 15 | 68 | Absence | — | 515 | 1540 | Comparative Example |
| 12 | 351 | 10 | 82 | Absence | — | 346 | 1118 | Comparative Example |
| 13 | 227 | 12 | 83 | Presence | 14 | 443 | 1430 | Comparative Example |
| 14 | 278 | 15 | 81 | Absence | — | 465 | 1480 | Inventive Example |
| 15 | 200 | 10 | 105 | Absence | — | 488 | 1520 | Inventive Example |
| 16 | 188 | 12 | 96 | Absence | — | 475 | 1503 | Inventive Example |
| 17 | 238 | 8 | 112 | Absence | — | 459 | 1462 | Inventive Example |
| 18 | 235 | 10 | 95 | Absence | — | 562 | 1620 | Inventive Example |
| 19 | 296 | 12 | 91 | Absence | — | 452 | 1445 | Inventive Example |
| 20 | 225 | 15 | 76 | Absence | — | 463 | 1470 | Inventive Example |
| 21 | 243 | 10 | 97 | Absence | — | 504 | 1550 | Inventive Example |
| 22 | 233 | 15 | 89 | Presence | 10 | 463 | 1469 | Comparative Example |
| 23 | 208 | 10 | 110 | Presence | 15 | 472 | 1496 | Comparative Example |
| 24 | 381 | 12 | 89 | Absence | — | 320 | 1040 | Comparative Example |
| 25 | 591 | 15 | 73 | Absence | — | 480 | 1510 | Comparative Example |
| 26 | 275 | 12 | 70 | Absence | — | 483 | 1520 | Inventive Example |
| 27 | 268 | 10 | 80 | Absence | — | 465 | 1475 | Inventive Example |
| 28 | 239 | 15 | 65 | Absence | — | 470 | 1493 | Inventive Example |

*1) Coating weight per side of steel sheet
*2) Method of cooling surface of blank sheet
*3) Surface temperature of blank sheet
*4) Average temperature of blank sheet estimated from press forming load
*5) Temperature of center position of blank sheet in thickness direction by heat transfer calculation In the hot press formed parts of all of the inventive examples and comparative examples, cracking exceeding 30 µm in depth from the interface between the coating layer and the steel sheet was not found.

In some of the hot press formed parts of the comparative examples, however, microcracks (minute cracking passing through the interface between the coating layer and the steel sheet and reaching the inside of the steel sheet) were found. In the hot press formed parts of the comparative examples with no microcrack, the press forming load during hot press forming exceeded 300 tonf.

In the hot press formed parts of all of the inventive examples, on the other hand, no microcrack (minute cracking passing through the interface between the coating layer and the steel sheet and reaching the inside of the steel sheet) was found, and the press forming load during hot press forming was low, i.e. less than 300 tonf. Moreover, in the hot press formed parts of all of the inventive examples, the tensile strength was 1300 MPa or more.

Figure 6:
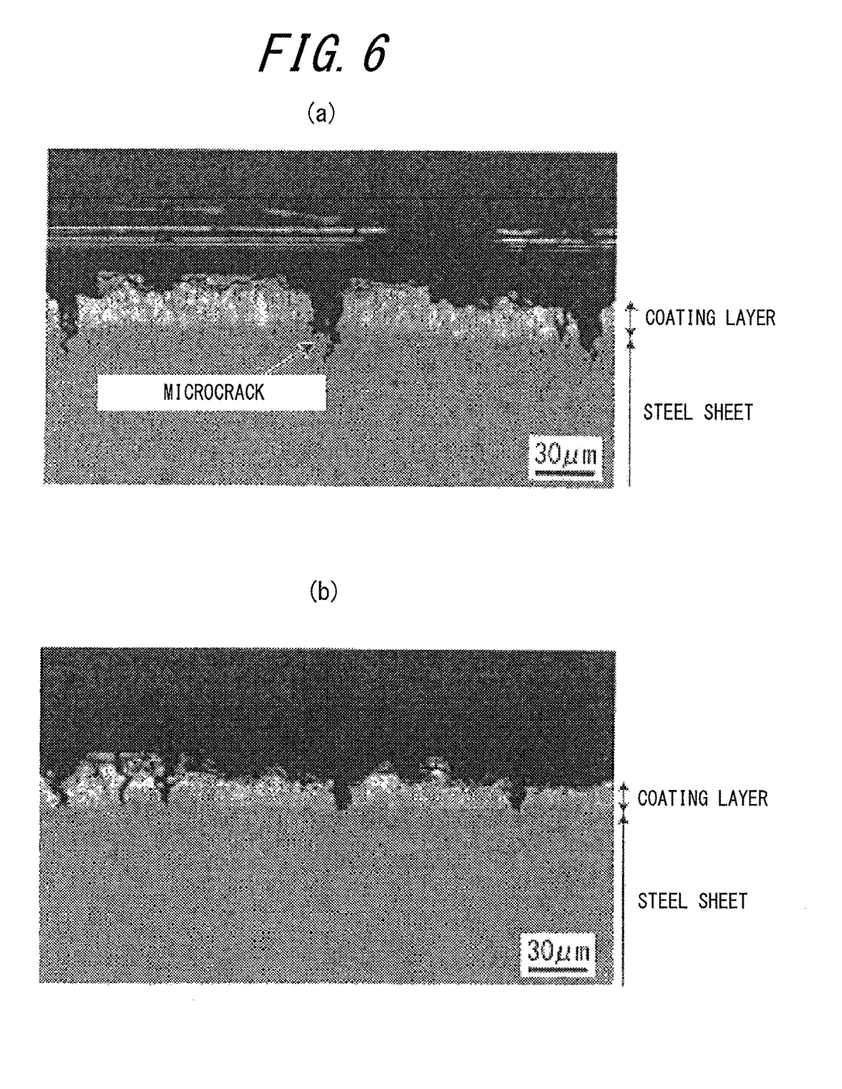

FIG. 6 illustrates part of the SEM observation results. FIG. 6(a) illustrates the result of SEM observation of part No. 23 (comparative example) in Table 2, where minute cracking (microcrack) reaching the inside of the steel sheet is seen. FIG. 6(b) illustrates the result of SEM observation of part No. 14 (inventive example) in Table 2, where no microcrack reaching the inside of the steel sheet is seen though the coating layer has cracking.

REFERENCE SIGNS LIST 1 coating layer
2 steel sheet
3 microcrack
h microcrack depth

The invention claimed is:

1. A method of manufacturing a hot press formed part by hot pressing a coated steel sheet that is obtained by forming a Zn-based coating layer on a surface of a steel sheet, the method comprising:
heating the coated steel sheet to a temperature range of 750° C. or more and 1000° C. or less;
cooling a surface of the coated steel sheet; and
hot press forming the coated steel sheet under a condition that a surface temperature of the coated steel sheet is 400° C. or less and an average temperature of the coated steel sheet is 500° C. or more.

2. The method of manufacturing a hot press formed part according to claim 1,
wherein the coating layer is a Zn—Ni coating layer, and a Ni content in the Zn—Ni coating layer is 9% or more and 25% or less by mass.

3. The method of manufacturing a hot press formed part according to claim 2, wherein the steel sheet has a chemical composition that includes, in % by mass: 0.15% or more and 0.50% or less C; 0.05% or more and 2.00% or less Si; 0.50% or more and 3.00% or less Mn; 0.10% or less P; 0.050% or less S; 0.0002% or more and 0.0050% or less B; 0.10% or less Al; and 0.010% or less N, with a balance including Fe and incidental impurities.

4. The method of manufacturing a hot press formed part according to claim 3,
wherein the chemical composition further includes, in % by mass, at least one type selected from the group consisting of: 0.01% or more and 0.5% or less Cr; 0.01% or more and 0.5% or less V; 0.01% or more and 0.5% or less Mo; and 0.01% or more and 0.5% or less Ni.

5. The method of manufacturing a hot press formed part according to claim 4,
wherein the chemical composition further includes, in % by mass, 0.01% or more and 0.20% or less Ti.

6. The method of manufacturing a hot press formed part according to claim 5,
wherein the chemical composition further includes, in % by mass, 0.01% or more and 0.10% or less Nb.

7. The method of manufacturing a hot press formed part according to claim 6, wherein the chemical composition further includes, in % by mass, 0.003% or more and 0.03% or less Sb.

8. The method of manufacturing a hot press formed part according to claim 1, wherein the coating layer is a Zn—Fe coating layer, and a Fe content in the Zn—Fe coating layer is 5% or more and 80% or less by mass.

9. The method of manufacturing a hot press formed part according to claim 1,
wherein the steel sheet has a chemical composition that includes, in % by mass: 0.15% or more and 0.50% or less C; 0.05% or more and 2.00% or less Si; 0.50% or more and 3.00% or less Mn; 0.10% or less P; 0.050% or less S; 0.0002% or more and 0.0050% or less B; 0.10% or less Al; and 0.010% or less N, with a balance including Fe and incidental impurities.

10. The method of manufacturing a hot press formed part according to claim 9,
wherein the chemical composition further includes, in % by mass, at least one type selected from the group consisting of: 0.01% or more and 0.5% or less Cr; 0.01% or more and 0.5% or less V; 0.01% or more and 0.5% or less Mo; and 0.01% or more and 0.5% or less Ni.

11. The method of manufacturing a hot press formed part according to claim 10,
wherein the chemical composition further includes, in % by mass, 0.01% or more and 0.20% or less Ti.

12. The method of manufacturing a hot press formed part according to claim 11,
wherein the chemical composition further includes, in % by mass, 0.01% or more and 0.10% or less Nb.

13. The method of manufacturing a hot press formed part according to claim 12,
wherein the chemical composition further includes, in % by mass, 0.003% or more and 0.03% or less Sb.

14. A method of manufacturing a hot press formed part by hot pressing a coated steel sheet that is obtained by forming a Zn-based coating layer on a surface of a steel sheet, the method comprising:
heating the coated steel sheet to a temperature range of 750° C. or more and 1000° C. or less;
cooling a surface of the coated steel sheet; and
hot press forming the coated steel sheet under a condition that a surface temperature of the coated steel sheet is 400° C. or less and a temperature of a center position of the coated steel sheet in a thickness direction is 530° C. or more.

15. The method of manufacturing a hot press formed part according to claim 14,
wherein the coating layer is a Zn—Ni coating layer, and a Ni content in the Zn—Ni coating layer is 9% or more and 25% or less by mass.

16. The method of manufacturing a hot press formed part according to claim 15,
wherein the steel sheet has a chemical composition that includes, in % by mass: 0.15% or more and 0.50% or less C; 0.05% or more and 2.00% or less Si; 0.50% or more and 3.00% or less Mn; 0.10% or less P; 0.050% or less S; 0.0002% or more and 0.0050% or less B; 0.10% or less Al; and 0.010% or less N, with a balance including Fe and incidental impurities.

17. The method of manufacturing a hot press formed part according to claim 16,
wherein the chemical composition further includes, in % by mass, at least one type selected from the group consisting of: 0.01% or more and 0.5% or less Cr; 0.01% or more and 0.5% or less V; 0.01% or more and 0.5% or less Mo; and 0.01% or more and 0.5% or less Ni.

18. The method of manufacturing a hot press formed part according to claim 17, wherein the chemical composition further includes, in % by mass, 0.01% or more and 0.20% or less Ti.

19. The method of manufacturing a hot press formed part according to claim 18,
wherein the chemical composition further includes, in % by mass, 0.01% or more and 0.10% or less Nb.

20. The method of manufacturing a hot press formed part according to claim 19, wherein the chemical composition further includes, in % by mass, 0.003% or more and 0.03% or less Sb.

* * * * *